UNITED STATES PATENT OFFICE.

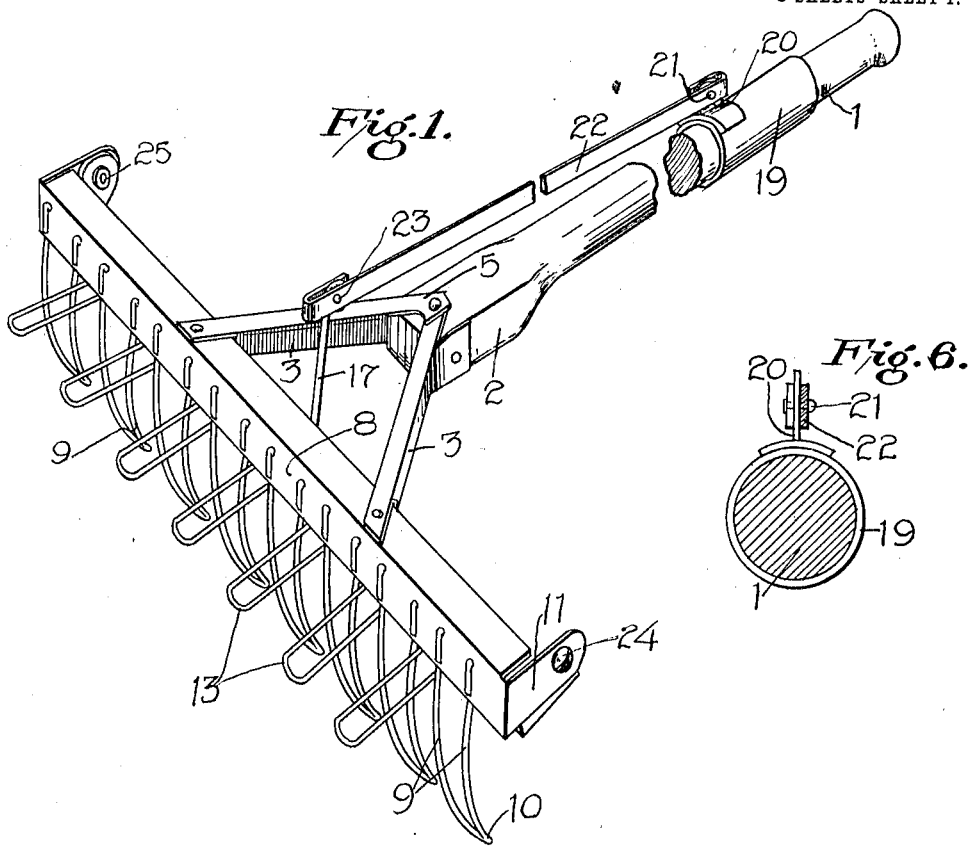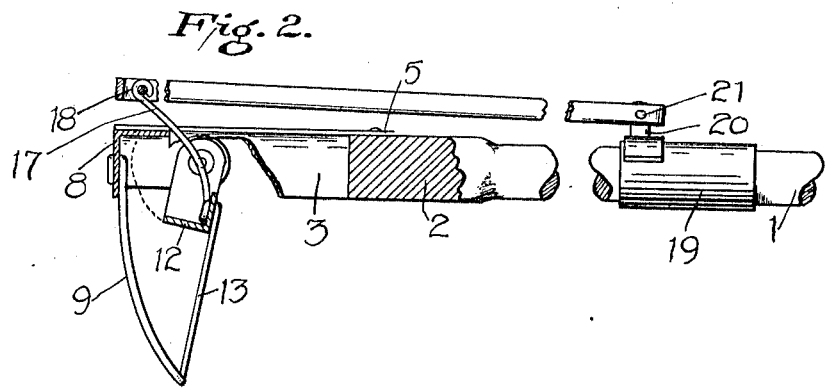

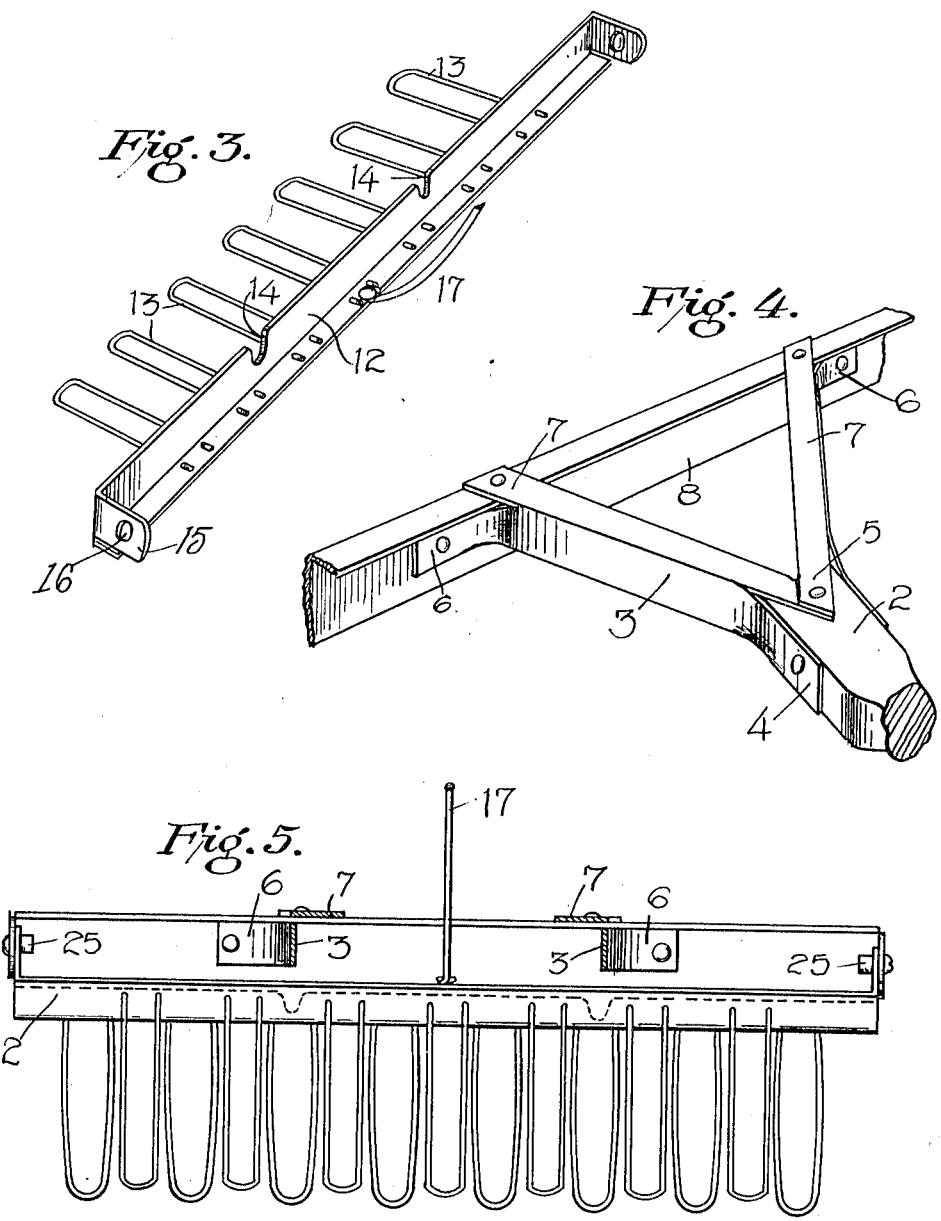

HENRY D. ALEXANDER, OF CANTON, OHIO.

RAKE.

1,096,342. Specification of Letters Patent. Patented May 12, 1914.

Application filed December 23, 1913. Serial No. 808,432.

*To all whom it may concern:*

Be it known that I, HENRY D. ALEXANDER, a citizen of the United States, residing at Canton, in the county of Stark and State of Ohio, have invented certain new and useful Improvements in Rakes; and I do hereby declare the following to be a full, clear, and exact description of the invention, such as will enable others skilled in the art to which it appertains to make and use the same.

This invention relates to new and useful improvements in rakes and has for its object the provision of a rake having an extension thereon, by means of which the teeth of the rake may be stripped of foreign substance which may have gathered during the process of raking.

A further object of my invention is a novel combination and arrangement of parts for supporting the rake teeth in such position as to be stripped of trash or other matter which may have gathered thereon.

A still further object of my invention is the provision of a novel means for supporting the rake teeth and also for supporting the stripping members on the stripping bar.

A still further object of my invention is the provision of a novel method for securing the rake head in position on the handle.

With the above and other objects in view, I will now proceed to describe my invention in the following specification and accompanying drawings, in which—

Figure 1 is a detail perspective view of the rake constructed in accordance with my invention, Fig. 2 is a transverse sectional view of the rake head showing the handle partly in section to more clearly illustrate the method of securing the stripping member to the rake head. Fig. 3 is a detail perspective view of the stripping element by means of which the teeth are stripped of any trash that may have gathered thereon, Fig. 4 is a detail perspective rear view of the rake head showing the novel method of securing the same to the handle in detail, Fig. 5 is a longitudinal sectional view of the rake head showing the stripping element in its lowered position, and Fig. 6 is a transverse sectional view of the rake handle showing the sleeve for operating the stripping element in detail.

Referring to the drawings by characters of reference, 1 indicates the handle of a rake constructed in accordance with my improved device which is preferably provided at its forward extremity with a suitable enlarged portion indicated generally by the numeral 2. A pair of L-bars 3 are provided with the extensions 4 which are bent angularly with relation thereto and adapted to be secured to the enlarged portion of the handle in any suitable manner. These extensions 4 are preferably vertically disposed with relation to the head of the rake and are adapted to lie in parallel relation with each other on each side of the enlarged portion as will be clearly seen on referring to the drawings. Each of said bars 3 is provided with an extension 5 which extends horizontally and is secured to the enlarged portion of the rake handle in any suitable manner. The forward ends of the bars 3 gradually diverge from each other and are provided with the angular extensions 6 and the projection 7 by means of which the rake head indicated by the numeral 8, is secured thereto. This rake head 8 is preferably provided at spaced intervals with suitable apertures through which the ends of the bars of the U-shaped members 9 are adapted to extend. These U-shaped members are preferably bent as clearly shown at 10 in Fig. 1 to form the lower extremities of the rake teeth.

The rake head 8 is preferably formed of an angle bar, the ends of which are provided with cut-away portions to form the extensions 11 which are adapted to be bent rearwardly as clearly shown in Fig. 1 to form the connection by means of which the stripping element, which will be more fully hereinafter described, is pivotally secured to the rake head. The stripping element above referred to, is preferably formed of an angle bar, which is indicated by the numeral 12 in Fig. 3, one face of which is provided with spaced apertures through which the free ends of the bars of the U-shaped members 13 are adapted to extend. These free ends are preferably bent back upon themselves as will be clearly seen in Fig. 3, to more firmly secure the U-shaped members in place. The portion of the angle bar opposite the one which supports the teeth, is preferably provided intermediate its ends with the recesses 14 to permit the same to more closely fit beneath the angle bar 8 when the device is in use. The face of the angle bar upon which the U-shaped members are secured, is preferably cut away at each end to provide for the angular extensions 15 having the apertures 16 therein, which coöperate with the angular extensions 11 to pivotally secure the stripping element to the rake head. Suitably secured intermediate the ends of the stripping element and to the face of the angle bar carrying the U-shaped members I preferably provide the upwardly and rearwardly extending arm 17 which terminates at its upper extremity in a suitable loop 18, the use of which will be more fully hereinafter described.

A suitable sleeve 19 is slidably mounted on the handle portion 1 and is provided at its forward end with the upstanding ear 20 having a suitable aperture extending therethrough, by means of which the link 22 is pivotally secured to the sleeve. This link 22 is preferably provided at its upper extremity with a suitable aperture for the reception of a pin or rivet 23 by means of which it is pivotally secured to the member 18 formed on the angular extension 17. Extending through the apertures in the ears 11 and 15 respectively, I preferably provide the bolt 24 having the nut 25 threaded thereon, by means of which the stripping element is pivotally secured in place on the rake head.

It will be obvious from the foregoing that in use when it is desired to strip the teeth of any foreign matter gathered thereon during the process of raking, the user needs only to slide the sleeve 19 forward, which will cause the link 22 to exert pressure against the extension 17 and thereby swing the stripping element downwardly and rearwardly around the pivot point, which action will cause any trash that may have gathered upon the teeth to be forced toward the end thereof and thus clean the teeth. Upon returning the sleeve to its normal position, it will be obvious that the stripping element will be swung upwardly and the process of raking may be resumed without any interference of the cleaning mechanism.

While in the foregoing I have shown and described the preferred embodiment of my invention, I wish it to be understood that I may make such changes in the combination and arrangement of parts as may fall in the scope of the claims herewith submitted.

Having thus described my invention, I claim:

1. In a rake, a head comprising an angle bar, teeth secured to the head, angular extensions formed at the ends of the angle bar, said angular extensions having apertures therein, a second angle bar having stripping members secured thereto, extensions at the ends of the first mentioned angle bar, said extensions having apertures therein, pins extending through the apertures in both of the extensions on the rake head and the stripping members, and means to swing the end of the stripping members downwardly toward the end of the rake head and thereby force any trash off the end of the rake teeth.

2. In a device of the character described, a rake head comprising an angle bar having apertures therein, U-shaped members secured in the apertures in the angle bar and bent rearwardly to form rake teeth, angular extensions at each extremity of the angle bar, a second angle bar pivotally secured to the angular extensions, U-shaped members secured to the second mentioned angle bar and extending between the U-shaped members secured to the first mentioned angle bar, a rake handle, means to secure the rake head to the handle, and means slidable on the rake handle to cause the second mentioned angle bar to force any trash from the end of the rake teeth.

3. A rake comprising a handle, an angle bar secured to said handle, angular extensions at each end of said angle bar, teeth carried by the angle bar and extending downwardly with relation to the handle, a stripping element comprising an angle bar, U-shaped members extending outwardly from the angle bar, extensions formed at each extremity of the second mentioned angle bar, and means to pivotally secure said extensions together to hold the angle bars in pivoted relation.

4. In combination with a rake, comprising a handle having an enlarged portion at one end, a pair of arms extending outwardly from said enlarged portion and diverging from each other, an angle bar supported by the free end of the arm, a series of U-shaped members forming rake teeth supported by one of the faces of the angle bar, extensions formed at the ends of the angle bar, and bent rearwardly, a second angle bar having extensions formed at the end thereof pivotally secured to the first mentioned extensions, a plurality of U-shaped members supported by one of the faces of the second mentioned angle bar and adapted to lie between the rake teeth, a rearward extension formed on the second mentioned angle bar and extending upwardly between the arms of the handle, a sleeve slidable on the handle, and a link connected to the sleeve and to the last mentioned extension whereby when the sleeve is slid along the handle, the second mentioned U-shaped members will swing downwardly and force any trash from the ends of the rake teeth when the device is in use.

In testimony whereof I affix my signature in presence of two witnesses.

HENRY D. ALEXANDER.

Witnesses:
BLANCHE F. BAER,
C. G. HERBRUCK.